US005875090A

United States Patent [19]

Joulie et al.

[11] Patent Number: 5,875,090

[45] Date of Patent: Feb. 23, 1999

[54] LIGHTNING ARRESTOR WITH A THERMOPLASTIC ENVELOPE HAVING AN EMBOSSED OUTSIDE SURFACE

[75] Inventors: Rene Joulie, Bellerive sur Allier; Serge Tartier, Cusset, both of France

[73] Assignee: Sediver, Societe Europene D/Isolateurs En Verre Et Composite, Nanterre, France

[21] Appl. No.: 994,856

[22] Filed: Dec. 19, 1997

[30] Foreign Application Priority Data

Dec. 23, 1996 [FR] France .................................... 9615852

[51] Int. Cl.[6] ........................................................ H02H 1/00

[52] U.S. Cl. ............................ 361/117; 361/118; 361/127

[58] Field of Search ................................ 361/56, 91, 111, 361/113, 118, 117, 126, 127

[56] References Cited

U.S. PATENT DOCUMENTS 4,825,188 4/1989 Parraud ...................................... 338/21
4,962,440 10/1990 Johnnerfelt .............................. 361/126
5,128,824 7/1992 Yaworski ................................ 361/127

FOREIGN PATENT DOCUMENTS 0335480 10/1989 European Pat. Off. .......... H01T 1/15
0595376 5/1994 European Pat. Off. .......... H01T 1/15
2685533 12/1991 France ............................. H01L 7/12

OTHER PUBLICATIONS

Patent Abstract of Japan, vol. 13, no. 390 (E–813) 29 Aug. 1989 and JP–A–1 137 603 (Otawa Denki Kogyo) 30 May 1989.

*Primary Examiner*—Jeffrey Gaffin
*Assistant Examiner*—Stephen W. Jackson
*Attorney, Agent, or Firm*—Ware, Fressola, Van Der Sluys & Adolphson LLP

[57] ABSTRACT

The lightning arrestor has two metal end fittings for connection purposes, a stack of electrically conductive components extending along a longitudinal axis between the two end fittings, and an envelope surrounding the electrical components and the end fittings in such a manner as to maintain electrical contact between the components. The envelope is made of a thermoplastic material that molded over the electrical components and the end fittings. It has an embossed outside surface including depressions and projections. The depressions correspond to zones of reduced envelope wall thickness and they serve to constitute lateral openings through the envelope for allowing gas to escape to the atmosphere.

8 Claims, 1 Drawing Sheet

LIGHTNING ARRESTOR WITH A THERMOPLASTIC ENVELOPE HAVING AN EMBOSSED OUTSIDE SURFACE

TECHNICAL FIELD

The invention relates to a surge shunt or lightning arrestor comprising two metal end fittings for connection purposes, a stack of electrically conductive components extending along a longitudinal axis between the two end fittings, and an envelope surrounding the electrical components and the end fittings so as to keep these components in electrical contact.

BACKGROUND OF THE INVENTION

Such a surge shunt or lightning arrestor is designed to be connected to electrical equipment for the purpose of enabling it to be bypassed by pulses of surge current. Such surge current pulses occur, for example, during strokes of lightning. When this takes place, the lightning arrestor diverts the current pulse to ground, thereby protecting the electrical equipment and the circuit from being damaged or even destroyed.

In present lightning arrestors, the envelope surrounding the conductive electrical components, generally cylindrical varistor blocks, is constituted by a resin-impregnated winding of glass fibers, with the assembly being received in an insulating housing of an elastomer polymer that is weatherproof.

For a lightning arrestor to operate properly, intimate contact must be maintained between the varistor blocks. This contact is ensured by the structure of the envelope which puts the varistor blocks into axial compression. Where appropriate, a spring can be interposed between one of the end fittings and the varistor block situated at the corresponding end of the stack in order to achieve such axial compression.

Such lightning arrestors can fail, in which case they can be the seat of large leakage currents giving rise to high gas pressures inside the envelope and thus leading to the lightning arrestor bursting. To limit or prevent this risk of bursting, it is known to provide a glass fiber winding that leaves lateral openings so that gases can escape to the atmosphere. Such a structure, known from European patent No. 0 335 480, is nevertheless relatively expensive to manufacture and an object of the invention is to propose a shunt that is less expensive.

OBJECTS AND SUMMARY OF THE INVENTION

To this end the invention provides a surge shunt comprising two metal end fittings for connection purposes, a stack of electrical components extending along a longitudinal axis between the two end fittings, and an envelope surrounding the electrical components and the end fittings so as to maintain electrical contact between the components, wherein the envelope is made of a thermoplastic material molded onto the electrical components and the end fittings.

In a particular embodiment of a shunt of the invention, the envelope has an embossed outside surface with depressions and projections, the depressions corresponding to zones of reduced envelope wall thickness and serving to constitute lateral openings through the envelope for putting gas into communication with the atmosphere.

Excess gas pressure inside the envelope thus causes the envelope to break in its zones that are thin and therefore more fragile, i.e. in the depressions of its embossed surface, thereby enabling the gas to escape to the air via the openings created in this way without running the risk of the lightning arrestor bursting.

The shunt of the invention is of low cost and it requires only a short time for manufacture. The envelope of such a shunt can be made by injection molding or by compressing thermoplastic material onto the electrical components and the metal end fittings. It has no inclusions of air or moisture between the electrical components and the envelope or between the envelope and the housing of elastomer polymer material surrounding the envelope. The use of thermoplastic material is particularly advantageous since such material has a very short cycle time. Also, with molding taking place on a cold column (the electrical components in the mold being raised to a temperature of about 80° C. while the thermoplastic material in the mold is at a melting temperature of about 270° C.), the thermoplastic material which has a melting point that is generally very sharp, tends to freeze very quickly on coming into contact with the electrical components and does not penetrate between the components. There is therefore no need to protect the electrical components by means of a film that serves to avoid inclusion of material between the electrical components.

BRIEF DESCRIPTION OF THE DRAWING

Other characteristics and advantages of the invention appear further on reading the following description of an embodiment.

BEST MODE FOR CARRYING OUT THE INVENTION

Figure 1:
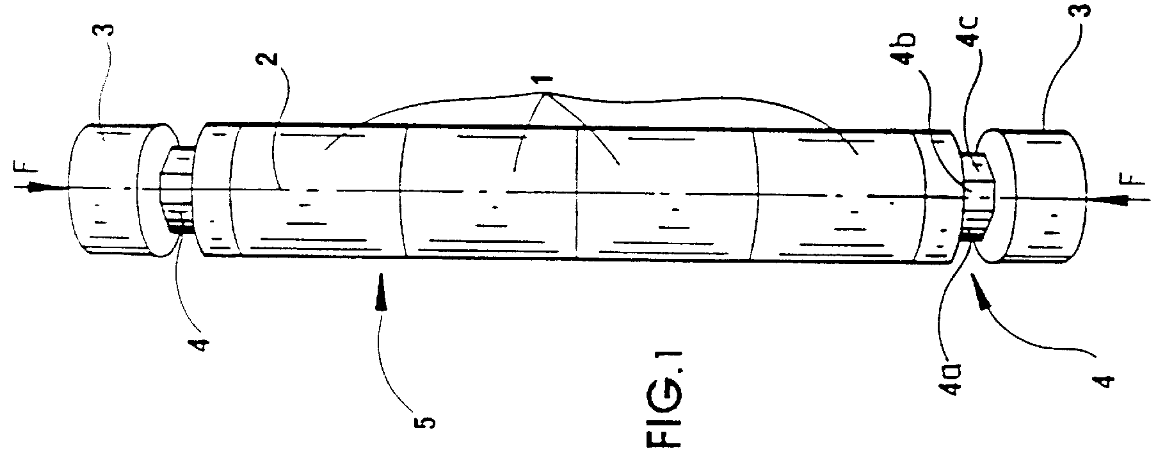
FIG. 1 is highly diagrammatic and shows an assembly comprising a stack of varistor blocks between two end fittings to constitute an insert.

In FIG. 1, the surge shunt or lightning arrestor of the invention comprises a set of electrical components that conduct in the event of a surge, e.g. cylindrical varistor blocks 1 that are stacked along a longitudinal axis 2 and that are in contact with one another via appropriate end faces. Each end face of the stack of varistor blocks is associated with a metal end fitting 3 for connection purposes.

Each end fitting 3 has an annular groove referenced 4 extending perpendicularly to the axis 2 and having base facets 4*a*, 4*b*, and 4*c* giving it a polygonal shape in cross-section relative to the axis 2, e.g. a hexagonal shape.

Figure 2:
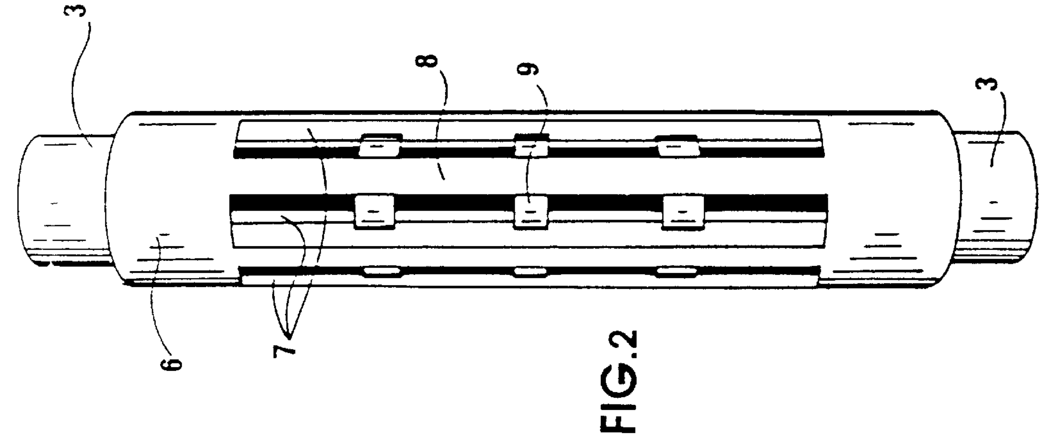
FIG. 2 is highly diagrammatic and shows the FIG. 1 assembly provided with an envelope of thermo-plastic material whose outside surface has an embossed structure.

In FIG. 2, an envelope 6 surrounds the varistor blocks 1 and the end fittings 3. According to the invention, this envelope is made of a thermoplastic material and it has an embossed outside surface with depressions 7 and projections 8 and 9.

The thermoplastic material is molded over the outside surface of the assembly 5 constituted by the stack of varistors 1 together with the metal end fittings 3. The envelope 6 can be made, for example, by injection molding a thermoplastic material in an injection mold containing the assembly 5, thereby making it possible to avoid any risk of inclusions of air or moisture between the varistor blocks and the envelope. The envelope 6 may also be prefabricated so as to be in the form of a tube of thermoplastic material. The assembly 5 is inserted into the prefabricated envelope which is then compression molded in a compression mold onto the assembly 5 so as to obtain depressions 7 corresponding to zones where the envelope is thin-walled.

In its thin-walled zones, the envelope 6 is capable of breaking locally if it is subjected to high gas pressure, and the lateral openings formed by the envelope breaking serve to allow the gas to escape to the atmosphere.

The projections of the outside surface of the envelope 6 define ribs that are longitudinal 8 and radial 9 relative to the axis 2. These ribs serve to constitute reinforcements for ensuring the mechanical strength and the rigidity of the insert constituted by the assembly 5 together with its envelope 6.

While the envelope 6 is being made by injection molding or by compressing thermoplastic material onto the assembly 5, a compression force F is exerted on each end of the assembly 5 along the axis 2 so as to avoid any relative displacement between the varistor blocks 1 and the end fittings 3 relative to the longitudinal axis of the stack, and also so as to avoid any inclusion of thermoplastic material between the varistor blocks. The compression force may be of the order of 100 Newtons (N).

Before the envelope of thermoplastic material is made, the assembly 5 is heated in an oven to raise its temperature to about 80° C., thereby reducing forces due to differential expansion while the thermoplastic material is setting.

The plastics material of the envelope fills the grooves 4 in the end fittings 3 so that the envelope is thoroughly engaged in the grooves, thereby ensuring that electrical contact is maintained between the varistor blocks, and, because of the facets, preventing the end fittings 3 from turning about the axis 2.

The plastics material may advantageously be filled with cut glass fiber or with silica to improve its mechanical characteristics and its self-extinction characteristics. Preferably, a thermoplastic material is used that has a very narrow melting point, e.g. a polyamide, a polyoxymethylene, or indeed a polyphthalamide, for making the envelope.

Figure 3:
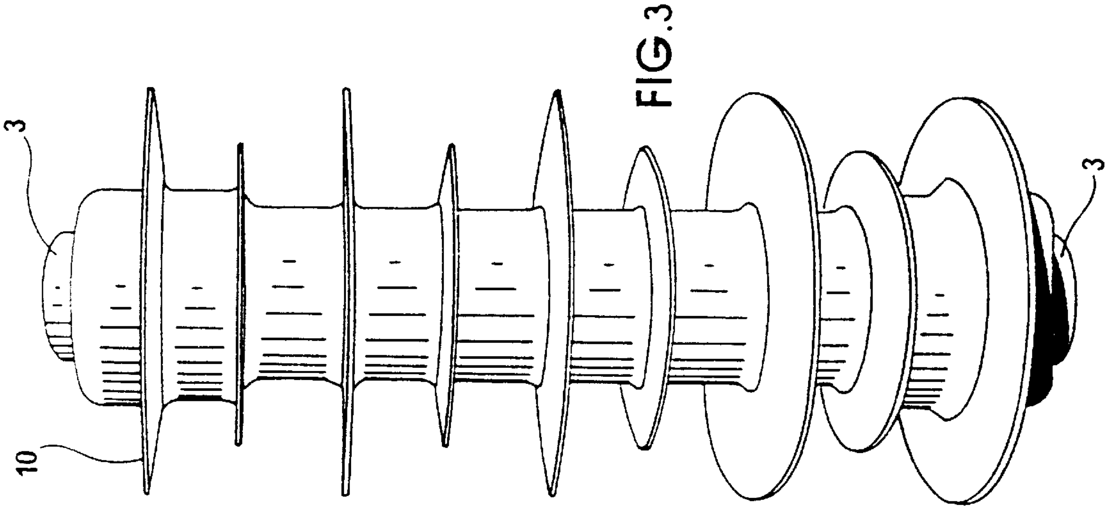
FIG. 3 is highly diagrammatic and shows a surge shunt of the invention together with its housing of elastomer polymer.

In FIG. 3, the envelope 6 of the insert is enclosed in a housing of elastomer polymer material 10 having annular fins. The housing is advantageously made by injecting the elastomer polymer material into an injection mold containing the insert. The elastomer polymer material fills the depressions 7 in the surface of the envelope without any risk of including gas or moisture between the envelope 6 and the housing 10.

Before making the housing, the outside surface of the envelope is prepared, e.g. it is sandblasted so as to be given a ground-glass appearance and so as to receive adhesive.

We claim:

1. A surge shunt comprising two metal end fittings for connection purposes, a stack of electrical components extending along a longitudinal axis between the two end fittings, and an envelope surrounding the electrical components and the end fittings so as to maintain electrical contact between the components, wherein the envelope is made of a thermoplastic material molded onto the electrical components and the end fittings, and wherein the envelope has an embossed outside surface with depressions and projections, the depressions corresponding to zones of reduced envelope wall thickness as to break locally when subjected to high pressure gas so that the zones of reduced envelope wall thickness then rupture to form lateral openings through the envelope so as to allow the gas to escape.

2. A shunt according to claim 1, in which each metal end fitting includes an annular groove with base facets in which the envelope engages.

3. A shunt according to claim 1, in which the projections of the embossed outside surface of the envelope constitute longitudinal ribs and radial ribs relative to said axis.

4. A shunt according to claim 1, including a housing of elastomer polymer material surrounding the envelope, said polymer material filling the depressions in the outside surface of the envelope.

5. A method of manufacturing a surge shunt according to claim 1, in which the envelope is molded on the electrical components and the metal end fittings by compressing a thermoplastic material in a mold containing the stack of electrical components between the two end fittings, said stack of electrical components being subjected to a compression force exerted along said longitudinal axis while the thermoplastic material is being compressed.

6. A method of manufacturing a shunt according to claim 1, in which the envelope is molded onto the electrical components and the metal end fittings by injecting thermoplastic material into a mold containing the stack of electrical components between the two end fittings, said stack of electrical components being subjected to a compression force exerted along said longitudinal axis while the thermoplastic material is being injected.

7. A method according to claim 6, in which the stack of electrical components between the two end fittings is heated prior to molding the thermoplastic material on the electrical components and the end fittings.

8. A method according to claim 7 wherein a housing of elastomer polymer material is molded to surround the envelope, said elastomer polymer material filling the depressions in the outside surface of the envelope.

* * * * *